United States Patent
Biggs et al.

(10) Patent No.: US 7,433,367 B2
(45) Date of Patent: Oct. 7, 2008

(54) METHOD AND APPARATUS FOR MAINTAINING COMMUNICATIONS WHEN RADIO COMMUNICATION IS UNAVAILABLE

(75) Inventors: Robert A. Biggs, Evanston, IL (US); Joseph E. Baum, Cary, IL (US); Mohammed A. Foustok, Coral Springs, FL (US); Stephen C. Glass, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 919 days.

(21) Appl. No.: 10/838,972

(22) Filed: May 4, 2004

(65) Prior Publication Data

US 2005/0249218 A1    Nov. 10, 2005

(51) Int. Cl.
*H04J 3/16*    (2006.01)
(52) U.S. Cl. .................................................... 370/466
(58) Field of Classification Search ............... 370/466, 370/467, 465, 471, 338, 349, 473, 475, 485, 370/432, 382, 389, 394, 401, 908, 912, 395.52, 370/395.53; 455/445, 552.1, 426.1, 556; 709/236
See application file for complete search history.

(56) References Cited

U.S. PATENT DOCUMENTS

| 6,434,134 | B1 | 8/2002 | La Porta |
| 6,614,774 | B1 | 9/2003 | Wang |
| 6,826,405 | B2 * | 11/2004 | Doviak et al. ............... 455/445 |
| 7,096,273 | B1 * | 8/2006 | Meier ......................... 709/236 |

* cited by examiner

*Primary Examiner*—Chi H. Pham
*Assistant Examiner*—Alexander Boakye
(74) *Attorney, Agent, or Firm*—Randi L. Karpinia; Indira Saladi

(57) ABSTRACT

A method and apparatus for maintaining communications between a mobile computer and a mobile subscriber unit is disclosed. The method and apparatus comprise determining whether a connection is available between the mobile subscriber unit and a radio communications system. If a connection is available, then the method and apparatus include retrieving a first IP address for the mobile computer from the radio communications system. Then, the method and apparatus comprise caching the first IP address in the mobile subscriber unit for use by the mobile computer. Finally, the method and apparatus include utilizing the first IP address even if the radio communications system is unavailable and updating the first IP address with a second IP address obtained from the radio communications system when the radio communications system is available.

15 Claims, 3 Drawing Sheets

METHOD AND APPARATUS FOR MAINTAINING COMMUNICATIONS WHEN RADIO COMMUNICATION IS UNAVAILABLE

FIELD OF THE INVENTION

The present invention relates generally to wireless communication systems and, in particular, to the field of radio communications.

BACKGROUND OF THE INVENTION

Wireless communication systems are well known in the art. In traditional wireless communication systems, real time services are typically implemented using a circuit switched infrastructure in conjunction with at least one dedicated wireless resource. A current trend in the industry, however, is the use of so-called packet switched infrastructures in support of wireless communication systems. In particular, the use of the Internet Protocol (network) is important to the communications of a wireless communication system utilizing packet switched infrastructure.

In such a system, wireless computers or communication units typically communicate with a wireless or radio access network (RAN) that in turn communicates with a packet switched networking forming a part of the infrastructure, such as the Internet or World Wide Web. Often, the target of the communication unit, such as a mobile computer, is a client, such as a mobile subscriber unit, coupled to the packet switched network. For the mobile computer to establish communications with another communication unit, the mobile computer needs an IP address, which is used to identify the source of communications. When radio coverage to the RAN is unavailable, the communication unit, such as the mobile computer, is unable to retrieve an IP address from the packet switched network; however, the mobile computer still requires an IP address to communicate with either the mobile subscriber unit or with the packet switched network regardless of the state of radio coverage.

Currently, solutions to address the need of the mobile computer to have connectivity to the mobile subscriber unit regardless of RAN coverage are imperfect. One solution uses Network Address Port Translation (NAPT) to allow the mobile computer and the mobile subscriber unit to communicate regardless of RAN coverage. A serious limitation of such a solution is that many applications and protocols associated with either the mobile computer or the mobile subscriber unit do not operate with NAPT. Thus, regardless of whether RAN coverage is available, many applications and protocols associated with the mobile computer or the mobile subscriber unit will not operate. Another solution requires that the mobile computer and the mobile subscriber unit maintain multiple connections to the packet switched network so that if one connection is unavailable, then another connection will still allow for communications. Such a solution, known in the art as multi-homing, is expensive and requires duplicating communication connections.

As a result, there exists a need for a method and apparatus for maintaining communications when a radio access network link is unavailable.

BRIEF DESCRIPTION OF THE FIGURES

A preferred embodiment of the invention is now described, by way of example only, with reference to the accompanying figure in which.

Figure 1:
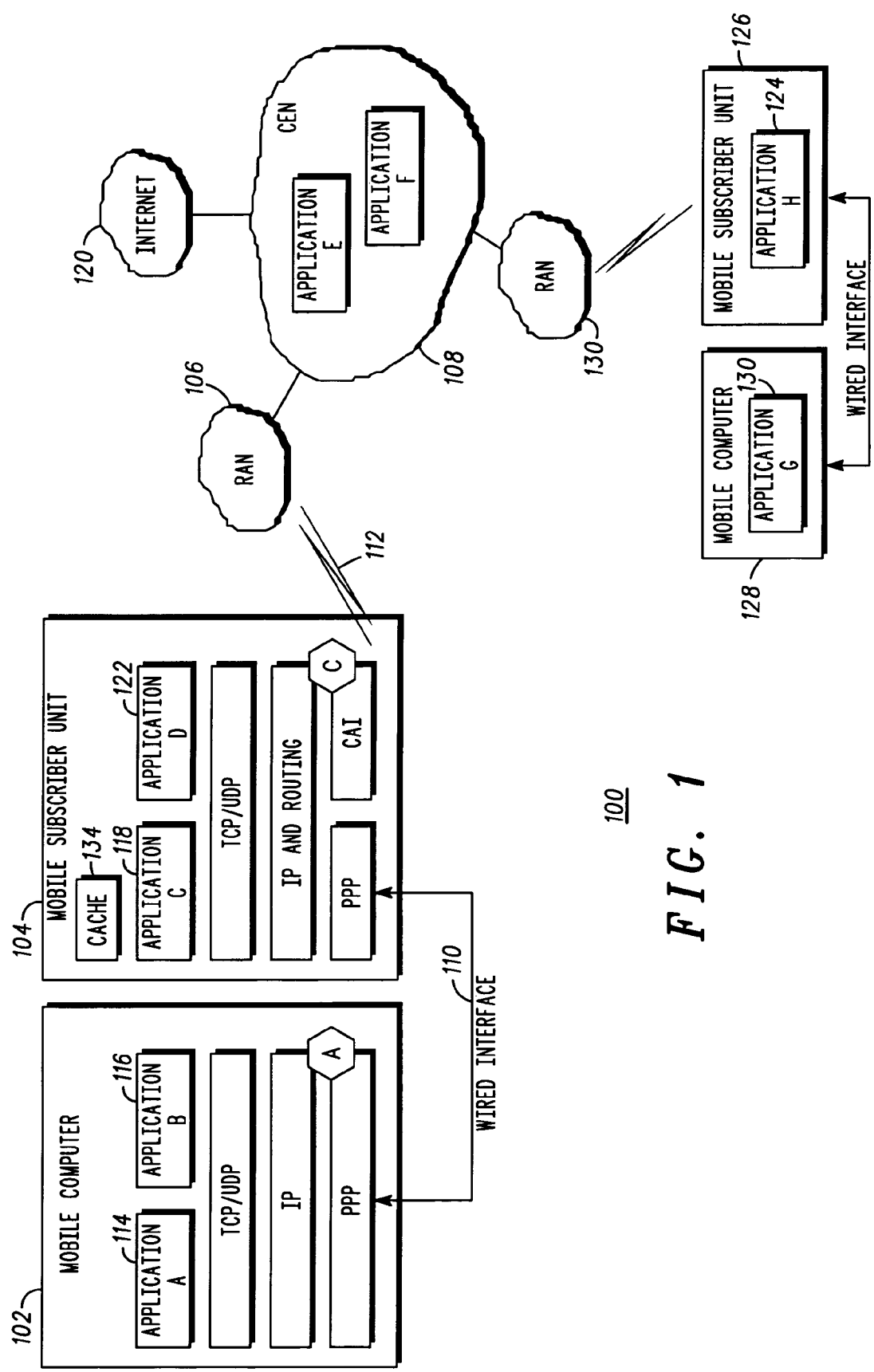
FIG. 1 is a block diagram illustrating components of an exemplary embodiment of an adaptive routing system in accordance with the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE PREFERRED EMBODIMENT

FIG. 1 illustrates an embodiment of an adaptive routing system 100 with a mobile computer (MC) 102, a mobile subscriber unit (MSU) 104, a radio access network (RAN) 106, and a customer enterprise network (CEN) 108. Optionally, the adaptive routing system 100 may be connected to the Internet 120. The adaptive routing system may also include MSU 126, MC 128, and RAN 132.

The MC 102, 128 may include known computer devices such as mobile computers, mobile workstations, handheld devices, and other wireless computers adaptable to communicate with a MSU 104, 126. For example, an exemplary embodiment of MC 102 includes mobile computers such as a Mobile Workstation 800 (MW800) and a Mobile Laptop (ML900), both of which are available from Motorola, Inc.

The MSU 104, 126 preferably comprises mobile or portable devices (such as an in-car or handheld radios or radio telephones) capable of communicating with the RAN 106 via one or more wireless channels over the wireless link 112. Typical mobile or portable devices are in-car or handheld radio or radio telephones. For example, an exemplary embodiment of MSU 104 includes mobile radios such as a Motorola XLT5000.

The wireless link 112 preferably comprises one or more radio frequency (RF) channels implementing any of a variety of known protocols and access schemes so that a MSU 104 is able to communicate with the CEN 108 as illustrated in FIG. 1. The RAN 106 may include base stations, antennas, repeaters, and other well-known radio infrastructure. As is known in the art, the RAN 106 may support one or more trunking communication platforms, such as frequency division multiple access (FDMA), time division multiple access (TDMA), and code division multiple access (CDMA).

The CEN 108 is a routed network of routers, switches, and hosts. Typically, the CEN 108 is an Intranet. For example for a public safety system, the CEN 108 may be a statewide police network, such as an Intranet for statewide police departments. In an exemplary embodiment, the CEN 108 is an Intranet. In an alternative, the CEN 108 may be connected to the Internet 120.

As used herein, a radio communications system comprises the wireless links 112, 134, the RANs 106, 132, and the CEN 108 of the adaptive routing system 100. Even though only two wireless links 112, 134 and two RANs 106, 132 are shown in FIG. 1, an exemplary embodiment of the adaptive routing system 100 may include any number of wireless links, RANs, and CENs.

Figure 2:
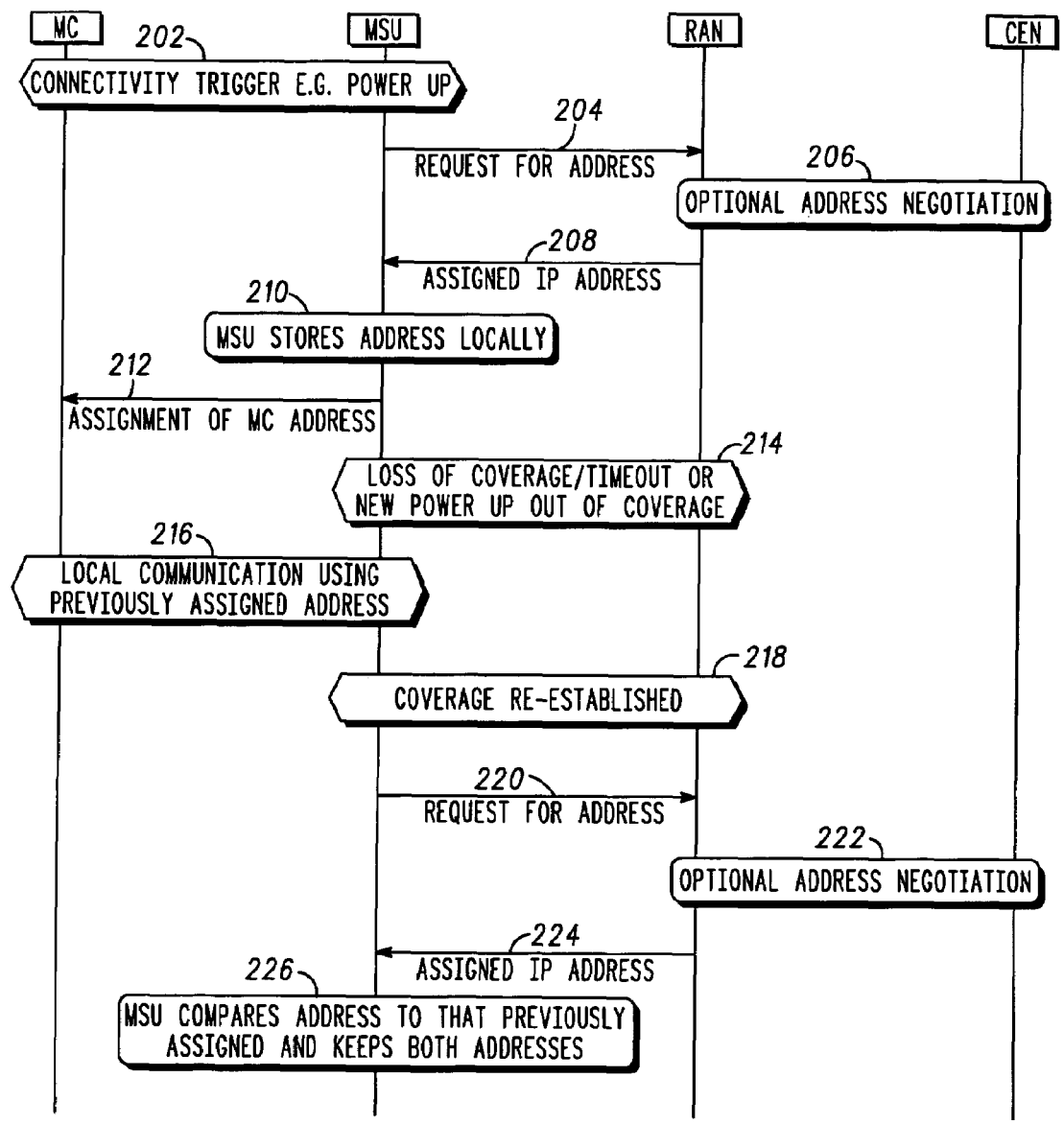
FIG. 2 is a flow diagram of an example communication process of the elements of FIG. 1 in accordance with the invention.

Referring now to FIG. 2, in operation, the MC 102 powers on and tries to connect to MSU 104 (Block 202). Other events such as loss of communication between the MC 102 and the MSU 104 may trigger a similar connectivity activity. Upon receiving a communication from the MC 102 that the MC 102 desires communication with the adaptive routing system 100, the MSU 104 sends a request for IP addresses to the RAN 106 (Message 204). In an alternate embodiment, the process of establishing communication between the MC 102 and the rest of the adaptive routing system 100 involves sending messages between the MSU 104 and the CEN 108 in order to establish an IP address for the MSU 104 (Block 206) and ultimately for the MC 102. For example, in an exemplary embodiment, dynamic host configuration protocol (DHCP) messages are sent between MSU 104 and CEN 108 to establish an IP address for the MC 102. DHCP messaging is a part of the Internet Engineering Task Force standard and will not be further described herein.

The goal of establishing connectivity is to get an IP address for the MSU 104 so that the MSU 104 appears as a network element within the CEN 108. The MSU 104 may request a number of addresses from the CEN 108 and may receive a number of addresses from the CEN 108 (block 208). The MSU 104 decides how to assign the addresses to itself and the MC 102. In an exemplary embodiment, the MSU 104 requests two addresses from the CEN 108, e.g. one address for the MSU 104 and one for the MC 102. Once the addresses are assigned to the MSU 104, the MSU 104 stores the IP addresses in a local memory e.g. cache 134 (Block 210).

While establishing a link 110 between the MC 102 and the MSU 104, the MSU 104 assigns an IP address to the MC 102 (Message 212). In an alternative embodiment, establishing a link 110 between the MC 102 and the MSU 104 involves reading a cache memory 134 of the MSU 104 to retrieve a stored IP address.

Once the MSU 104 has an IP address for itself and the MC 102, the MC 102 may be able to communicate with other elements in the adaptive routing system 100 and the other elements in the adaptive routing system 100 may be able to address the MSU 104. The other elements of the adaptive routing system 100 include CEN 108, MSU 126, and MC 128. For example, if the MC 102 desires to run an application through the MSU 104 to computer applications either in the CEN 108 or some other MSU or MC, such as MSU 126 or MC 128, then the MC 102 is able to notify the CEN 108, MSU 126, and MC 128 of its IP address so that communications between the elements in the adaptive routing system 100 may reach the MC 102. For example, Application C 118 in MSU 104 can communicate with Application H 124 in MSU 126.

Once the MSU 104 has an IP address from the CEN 108, the MSU 104 is able to assign the IP address to the MC 102 (Block 212). In an alternative embodiment, the MSU 104 also stores the IP address in a cache memory 134 of the MSU 104 (block 210). By having an IP address, the MC 102 is able to establish connectivity to the CEN 108 and to other elements in the adaptive router system 100.

Continuing with FIG. 2, if the link 112 from the MSU 104 to the RAN 106 is unavailable, e.g. because the signal is faded, a timeout has occurred, or the signal is otherwise lost, then the MSU 104 is not able to communicate with the CEN 108 to get IP addresses or for any other reason (Block 214). In an embodiment of the present invention, MSU 104 assigns a stored IP address retrieved from the cache 134 to the MC 102 (Block 216). The stored address may be an IP address previously received from the CEN 108; for example when communication was available with the CEN 108. Because the MC 102 is able to be addressed, communication between the MC 102 and MSU 104 may continue even though the link 112 is unavailable.

In a preferred embodiment, the IP addresses are stored in a cache 134 of the MSU 104. The cache 134 of the MSU 104 may be a typical non-volatile memory for storing IP addresses. As is known in the art, flash memory is an example of a typical non-volatile memory but many alternative types of non-volatile memory may be chosen for the storage of the IP addresses.

Being able to continue communication between the MC 102 and the MSU 104 is important and many times critical. For example, the MC 102 may need access to a GPS unit that is associated with the MSU 104. In addition, if the MC 102 is used as a virtual control head and is responsible for controlling the mission critical MSU 104, then communication between the MC 102 and MSU 104 is vital to the users of the adaptive routing system 100.

Further, giving the MC 102 an IP address that most likely is a correct IP address associated with the adaptive routing system 100 is important so that when connectivity with the CEN 108 is available, that reconfiguration of the MC 102 is not necessary. In the public safety setting, not having to waste time while the MC 102 is being reconfigured is many times critical. Further, reconfiguring the MC 102 breaks the link 110 between the MC 102 and the MSU 104, which also disrupts the applications running on the MC 102.

When the link 112 between the MSU 104 and the RAN 106 or the CEN 108 is once again available (Block 218), there are messages that are sent between the MSU 104 and the RAN 106 (and optionally the CEN 108 (Block 222)) to verify that the addresses previously given to the MSU 104 are still valid (Message 220). The MSU 104 may automatically trigger the request for address messaging once the link 112 is available. In an alternative embodiment, the request for address messaging is not automatically triggered and is requested by the CEN 108.

The CEN 108 typically assigns the same addresses to the same MSU 104 so that the job of managing IP addresses is made easier for the CEN 108 (Message 224). Thus, once connectivity is reestablished between the MSU 104 and the CEN 108, it is likely that the CEN 108 will assign the same previously assigned IP addresses to the MSU 104. Once the MSU 104 receives IP addresses, it compares the received IP addresses to the previously assigned IP addresses (Block 226). In an exemplary embodiment, the CEN 108 has knowledge of the source of the request by decoding a source field in the message that requests IP addresses. Thus, the CEN 108 has knowledge that a request for IP addresses is coming from a previously known MSU 104 by decoding a source field containing a unique identifier of the request message.

In one embodiment, verifying the source of the request is based upon knowledge of a unique identifier associated with the DHCP protocol. Specifically, the MSU 104 has an Ethernet address, so when it is requesting IP addresses, the CEN 108 can assign the same previously assigned IP addresses to the MSU 104 because the CEN 108 has knowledge that the request is from an Ethernet address that the CEN 108 has previously assigned IP addresses to.

In an alternative embodiment, verifying the source of the request is based upon knowledge of a unique identifier associated with sub-network dependent convergent protocol (SNDCP). SNDCP is an air interface specific protocol that defines messaging between a MSU 104 and the RAN 106 and allows for specific extensions to the DHCP registration protocol that defines the link between the RAN 106 and the CEN 108. In such an embodiment, the CEN 108 assigns IP addresses to the MSU 104 based upon the source of the request being the RAN 106.

The reason that the MC 102 needs an IP address is to avoid IP address translations in the adaptive routing system 100, namely in elements such as the MSU 104, the CEN 108 or at the RAN 106. Certain applications such as typical server based applications running on the mobile computer 102, 128 do not work well when IP address translation is required. A first example is web server applications. For example, if Application A 114 is a web server application running on mobile computer 102, then mobile computer 128 or any other computer in the adaptive routing system 100 may not be ale to access the application 114 if the mobile computer 102 does not know its own address. Specifically, the other computers in the adaptive routing system 100 may not be able to find the web server application 114 on MC 102 because MC 102 does not know its own address. The problem is that the routing of packets from the CEN 108 or other computers in the adaptive routing system 100 such as MSU 126 or MC 128 will have MC's 102 address but MC 102 will not know its own address for the routing of packets to correctly arrive at the MC 102.

A second example is peer to peer applications, such as SNMP registration, that exchange IP addresses in their messaging. If computers exchange IP addresses in the messages that are passed between them, the IP address will not get translated within the body of the message. Since address translation takes place at the network layers and not at the application layer, if the applications try to exchange IP addresses, the IP addresses that they exchange will be incorrect. Specifically, if Application B 116 is an SNMP registration application and Application G 130 is another SNMP registration application, then if the two applications attempt to communicate, they will be incorrectly addressing each other, since MC 128 may not know MC 102's current IP address is. For example, the IP address of mobile computer 128 might be address C, but mobile computer 102 understands it to be address A. If address A is broadcasted to another application, then the other computers in the adaptive routing system 100 will not be able to find MC 102. Mobile computer 102 needs to be careful that if it broadcasts an IP address that the mobile computer 102 broadcasts an accurate address so that applications from MC 128 or the CEN 108 can get to MC 102.

Figure 3:
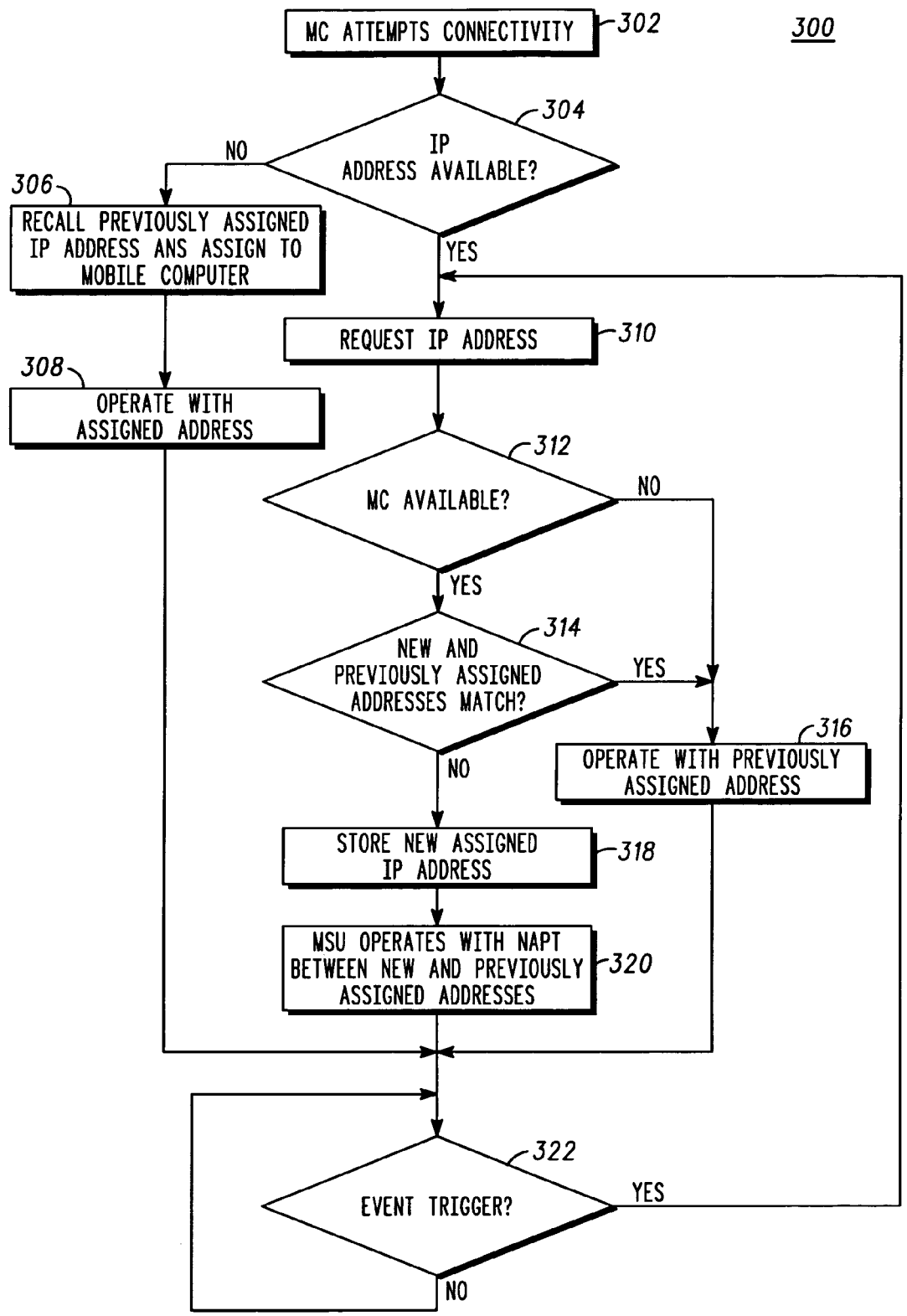
FIG. 3 is a flow chart illustrating an exemplary embodiment of a method for maintaining communications when a radio access network link is unavailable in accordance with the invention.

Referring to FIG. 3, at power up, the MC 102 attempts to connect to the MSU 104 (Block 302). Connection is established by sending messages by the MC 102 to the MSU 104 and receiving acknowledgements in response to sent messages. Next, the MSU 104 determines whether an IP address is available for use by the MC 102 (Block 304) by sending a request for address message to the CEN 108. If access to the CEN 108 is unavailable (Decision "NO" at Block 304), then the step of determining whether an IP address is available is completed by reading a memory of the MSU 104 to retrieve a previously stored IP address for the MC 102 (Block 306). In an exemplary embodiment, this step includes retrieving contents from a cache memory 134 of the MSU 104. Finally, the MC 102 operates with the IP address retrieved from the memory of the MSU 104 (Block 308).

If access to the CEN 108 is available (Decision "YES" at Block 304), then the MSU 104 requests IP addresses from the CEN 108 and stores the received IP addresses that are assigned by the CEN 108 in the MSU 104 (Block 310). In an exemplary embodiment, the MSU 104 requests and receives at least two IP addresses from the CEN 108. One IP address is kept by the MSU 104 for itself and the other IP address is assigned to the MC 102. The MSU 104 sends the IP address that it has assigned to the MC 102 to the MC 102. As used from herein, the IP address that the MSU 104 sends to the MC 102 is termed the "new" IP address. If the MC 102 is not currently available (Decision "NO" at Block 312), then the MC 102 does not receive the new IP address and the MC 102 continues to operate with the previously assigned address (Block 316).

If the MC 102 is available (Decision "YES" at Block 312), then the MC 102 receives the new IP address and checks to see whether the new IP address is the same as the IP address that it was previously assigned. If the new IP address and the previously assigned IP address are the same (Decision "YES" at Block 314), then the MC 102 continues to operate with the IP address that it was previously assigned. Since the new and previously assigned IP addresses are the same, the MC 102 does not need to make any changes to the IP address stored in memory.

If the new IP address is different than the IP address that the MC 102 has been using (Decision "NO" at Block 314), then the MC 102 stores the new IP address in memory (Block 318) and forms an association between the new IP address and the previously assigned IP address (Block 320). This association is called Network Address Protocol Translation (NAPT) and functions to translate the new IP address to the previously assigned IP address. Such translation ensures that messages destined for the MC 102 reach the MC 102 regardless of whether the MC 102 is using the new IP address or the previously assigned IP address.

Regardless of the IP address that the MC 102 is using, an event in the adaptive routing system 100 may trigger resolution of the IP addresses assigned by the CEN 108 to the MSU 104. Example events which may trigger this resolution include 1) an indication from the RAN 106 that service is available, 2) the MSU 104 moving into range of wireless coverage, 3) and the MSU 104 or MC 102 sending a communication to other elements in the adaptive routing network 100, such as the Internet 120. If such an event occurs and new IP addresses are received by the MSU 104 (Decision "YES" at Block 322), then the new addresses are processed by the MSU 104 and the data flow continues at Block 310. If such an event occurs and new IP addresses are not received by the MSU 104 (Decision "NO" at Block 322), then the previously assigned addresses are used by the MSU 104 and the data flow continues by looking for events that trigger changes in IP addresses.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

We claim:

1. A method for maintaining communications between a mobile computer and a mobile subscriber unit comprising the steps of
   determining at the mobile subscriber unit whether a connection is available between the mobile subscriber unit and a radio communications system and if a connection is available, retrieving a first IP address for the mobile computer from the radio communications system;
   caching the first IP address in the mobile subscriber unit for use by the mobile computer; and
   utilizing the first IP address even if the radio communications system is unavailable and then updating at the mobile subscriber unit the first IP address with a second IP address obtained from the radio communications system when the radio communications system is available.

2. The method of claim 1 further comprising the step of forming an association between the first IP address and the second IP address using IP address protocol translation to forward messages to the mobile computer whether addressed to the first IP address or addressed to the second IP address.

3. The method of claim 1 wherein the step of determining occurs upon power up of the mobile computer.

4. The method of claim 1 wherein the step of retrieving further comprises DHCP messaging between the mobile subscriber unit and the radio communications system.

5. The method of claim 1 wherein the radio communications system comprises at least one wireless link, at least one radio access network, and at least one customer enterprise network.

6. The method of claim 5 wherein the step of retrieving is performed from the at least one customer enterprise network of the radio communications system.

7. The method of claim 5 wherein the step of retrieving is performed from the at least one radio access network of the radio communications network.

8. The method of claim 1 further comprising the step of sending a message to the mobile computer with the first IP address.

9. The method of claim 1 further comprising the step of triggering resolution of the first IP address with the second IP address based upon an event in the radio communications system.

10. An adaptive routing system for maintaining communications between a mobile computer and a mobile subscriber unit comprising:
    the mobile computer connected by a wired interface to the mobile subscriber unit wherein the mobile subscriber unit contains cache memory for storing an IP address for the mobile computer retrieved from a radio communications network and the mobile subscriber unit is connected to the radio communications system by a wireless link,
    wherein communications are maintained between the mobile subscriber unit and the mobile computer when the wireless link is unavailable by utilizing the stored IP address.

11. The system of claim 10 wherein the radio communications system comprises at least one wireless link, at least one radio access network, and at least one customer enterprise network.

12. The system of claim 10 wherein the mobile subscriber unit further comprises a trigger for checking whether communication to a customer enterprise network is available.

13. The system of claim 10 wherein the mobile subscriber unit further comprises an associative memory which relates a first IP address of the IP address with a second IP address.

14. A system for maintaining communications between a mobile computer and a mobile subscriber unit comprising the steps of:
    means for determining at the mobile subscriber unit whether a connection is available between the mobile subscriber unit and a radio communications system and if a connection is available, means for retrieving a first IP address for the mobile computer from the radio communications system;
    means for caching the first IP address in the mobile subscriber unit for use by the mobile computer; and
    means for utilizing the first IP address even if the radio communications system is unavailable and then updating at the mobile subscriber unit the first IP address with a second IP address obtained from the radio communications system when the radio communications system is available.

15. The system of claim 14 further comprising means for forming an association between the first IP address and the second IP address using IP address protocol translation to forward messages to the mobile computer whether addressed to the first IP address or addressed to the second IP address.

* * * * *